(12) United States Patent
Kakishima et al.

(10) Patent No.: US 11,350,291 B2
(45) Date of Patent: May 31, 2022

(54) BEAM TRACKING MOBILE COMMUNICATION SYSTEM, BASE STATION, AND USER EQUIPMENT

(71) Applicant: NTT DOCOMO, INC., Tokyo (JP)

(72) Inventors: Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/126,101

(22) PCT Filed: Nov. 27, 2014

(86) PCT No.: PCT/JP2014/081369
§ 371 (c)(1),
(2) Date: Sep. 14, 2016

(87) PCT Pub. No.: WO2015/141065
PCT Pub. Date: Sep. 24, 2015

(65) Prior Publication Data
US 2017/0094531 A1 Mar. 30, 2017

(30) Foreign Application Priority Data
Mar. 20, 2014 (JP) .............................. JP2014-059180

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0456* (2013.01); *H04B 7/0617* (2013.01);
(Continued)

(58) Field of Classification Search
CPC ... H04W 16/28; H04W 24/10; H04W 72/042; H04B 7/0456; H04B 7/0617; H04L 5/0048; H04L 5/0055
See application file for complete search history.

(56) References Cited

U.S. PATENT DOCUMENTS 9,571,248 B2\* 2/2017 Yi .......................... H04L 5/0082
2010/0075706 A1\* 3/2010 Montojo ............... H04B 7/0691
455/513

(Continued)

FOREIGN PATENT DOCUMENTS

EP 1865626 A1 12/2007
EP 2706801 A1 3/2014
(Continued)

OTHER PUBLICATIONS

Office Action issued in the counterpart Japanese Patent Application No. 2014-059180, dated Dec. 13, 2016 (7 pages).
(Continued)

*Primary Examiner* — Christopher M Crutchfield
*Assistant Examiner* — Tito Q Pham
(74) *Attorney, Agent, or Firm* — Osha Bergman Watanabe & Burton LLP

(57) ABSTRACT

In a mobile communication system including a base station provided with a plurality of antenna ports, and user equipment that executes radio communication with the base station, the base station transmits a beam stream including a first beam for transmitting data to the user equipment, and one or more second beams for transmitting a precoded reference signal in a direction toward a vicinity of the first beam; and upon receiving the beam stream, the user equipment selects, from the first beam and the second beam, and transmits, to the base station, one or more suitable beam indexes.

3 Claims, 9 Drawing Sheets

(51) Int. Cl.
- *H04B 7/08* (2006.01)
- *H04B 7/0456* (2017.01)
- *H04L 5/00* (2006.01)
- *H04W 24/10* (2009.01)
- *H04W 72/04* (2009.01)

(52) U.S. Cl.
CPC ........... *H04B 7/0695* (2013.01); *H04B 7/088* (2013.01); *H04L 5/0048* (2013.01); *H04L 5/0055* (2013.01); *H04W 24/10* (2013.01); *H04W 72/042* (2013.01)

(56) References Cited

U.S. PATENT DOCUMENTS

| | | |
|---|---|---|
| 2010/0103044 A1 | 4/2010 | Hoshino et al. |
| 2013/0040684 A1 | 2/2013 | Yu et al. |
| 2013/0059619 A1 | 3/2013 | Kim et al. |
| 2013/0155847 A1* | 6/2013 | Li .................... H04W 76/10 370/225 |
| 2013/0215844 A1* | 8/2013 | Seol ................ H04W 72/046 370/329 |
| 2013/0242773 A1* | 9/2013 | Wernersson ........... H04B 7/024 370/252 |
| 2013/0258964 A1* | 10/2013 | Nam .................. H04W 72/04 370/329 |
| 2013/0272151 A1* | 10/2013 | Thomas ............... H04W 24/02 370/252 |
| 2015/0222340 A1 | 8/2015 | Nagata et al. |
| 2015/0327244 A1* | 11/2015 | Pajukoski ............ H04L 5/0003 370/330 |
| 2015/0351085 A1* | 12/2015 | Lee .................... H04L 5/005 370/252 |
| 2016/0028519 A1 | 1/2016 | Wei |

FOREIGN PATENT DOCUMENTS

| | | |
|---|---|---|
| JP | 2012-217194 A | 11/2012 |
| JP | 5153006 B2 | 2/2013 |
| WO | 2013032188 A2 | 3/2013 |
| WO | 2014038321 A1 | 3/2014 |
| WO | 2014117748 A1 | 8/2014 |

OTHER PUBLICATIONS

Extended European Search Report dated Jan. 26, 2017, in corresponding European Patent Application No. 14886105.7 (11 pages).
International Search Report issued in PCT/JP2014/081369, dated Jan. 27, 2015 (2 pages).
Written Opinion of the International Searching Authority issued in PCT/JP2014/081369, dated Jan. 27, 2015 (3 pages).
3GPP TSG RAN#58, RP-121994; "Study on Downlink Enhancements for Elevation Beamforming for LTE" (5 pages).
Samsung; "New SID Proposal: Study on Full Dimension MIMO for LTE"; 3GPP TSG RAN Meeting #58, RP-121804; Barcelona, Spain; Dec. 4-7, 2012 (6 pages) The document is titled as "RP-121804" but it is confirmed as "RP-122015".
Office Action issued in corresponding European Application No. 14886105.7, dated Feb. 9, 2018 (5 pages).
Office Action issued in corresponding Chinese Application No. 201480077121.4, dated Jan. 21, 2019 (19 pages).
Office Action issued in the counterpart European Application No. 14886105.7, dated Feb. 12, 2019 (4 pages).
Office Action issued in corresponding European Application No. 14886105.7, dated Aug. 26, 2019 (6 pages).
Summons to Attend Oral Proceedings issued in corresponding European Patent Application No. 14886105.7, dated Jun. 18, 2021 (8 pgs).
Decision to Refuse a European Patent application issued in Application No. 14886105.7 dated Mar. 9, 2022 (13 pages).

* cited by examiner

ELEVATION BEAMFORMING

Massive MIMO

TWO-DIMENSIONAL ARRAY OF
ELEMENTS FOR
SAME POLARIZATION (64 AP)

TWO-DIMENSIONAL ARRAY OF
ELEMENTS FOR
ORTHOGONAL POLARIZATION (128 AP)

FIG.2C
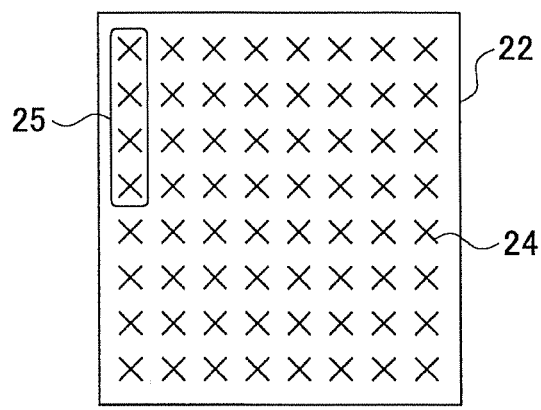
CASE WHERE A GROUP OF A PLURALITY OF ELEMENTS FORMS 1 AP
(E.G., FRAME CORRESPONDS TO 2 APS) (32 AP)
FIG.3A
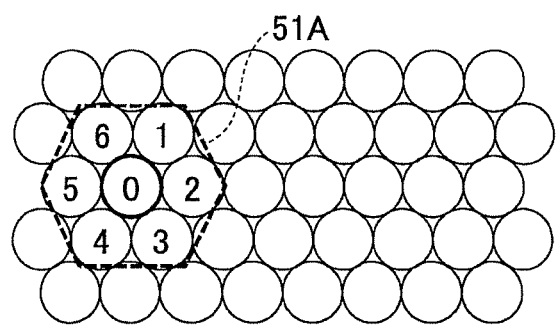
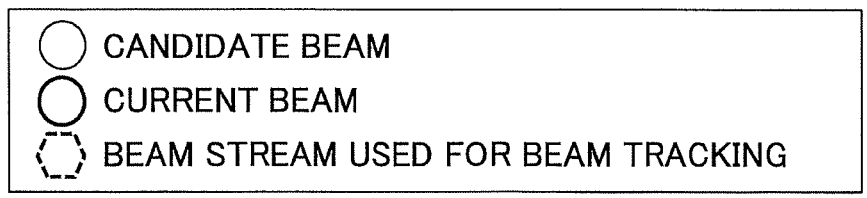

FIG.3B
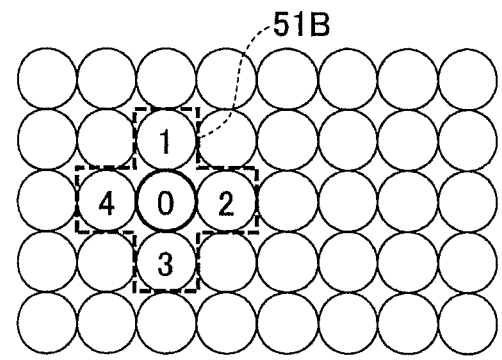
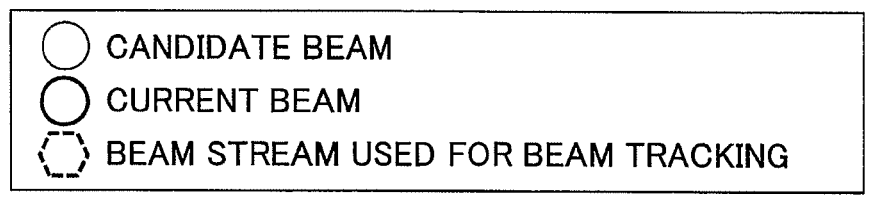
FIG.4
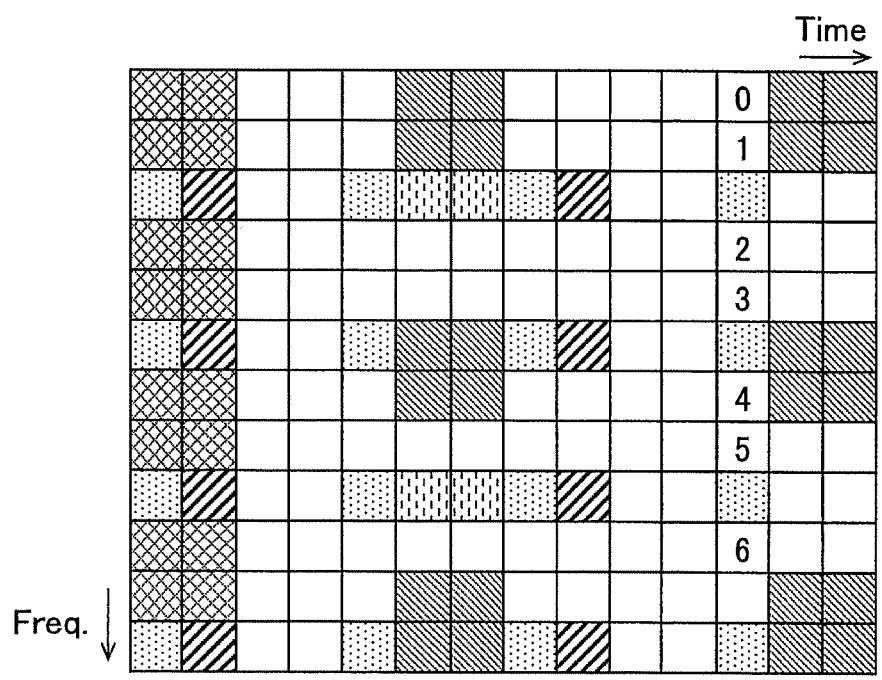

FIG.5
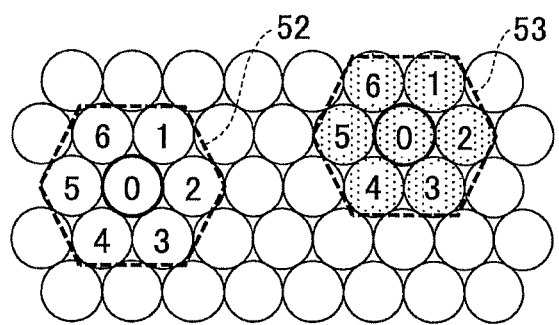
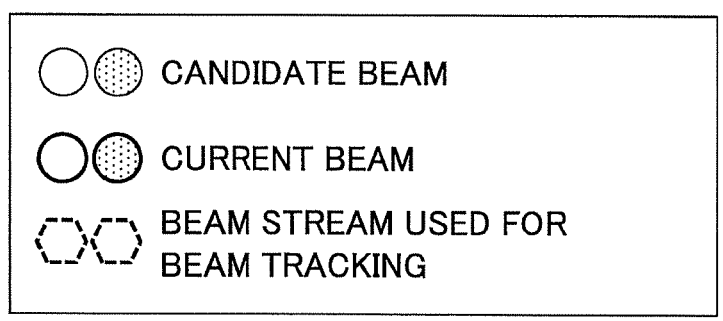

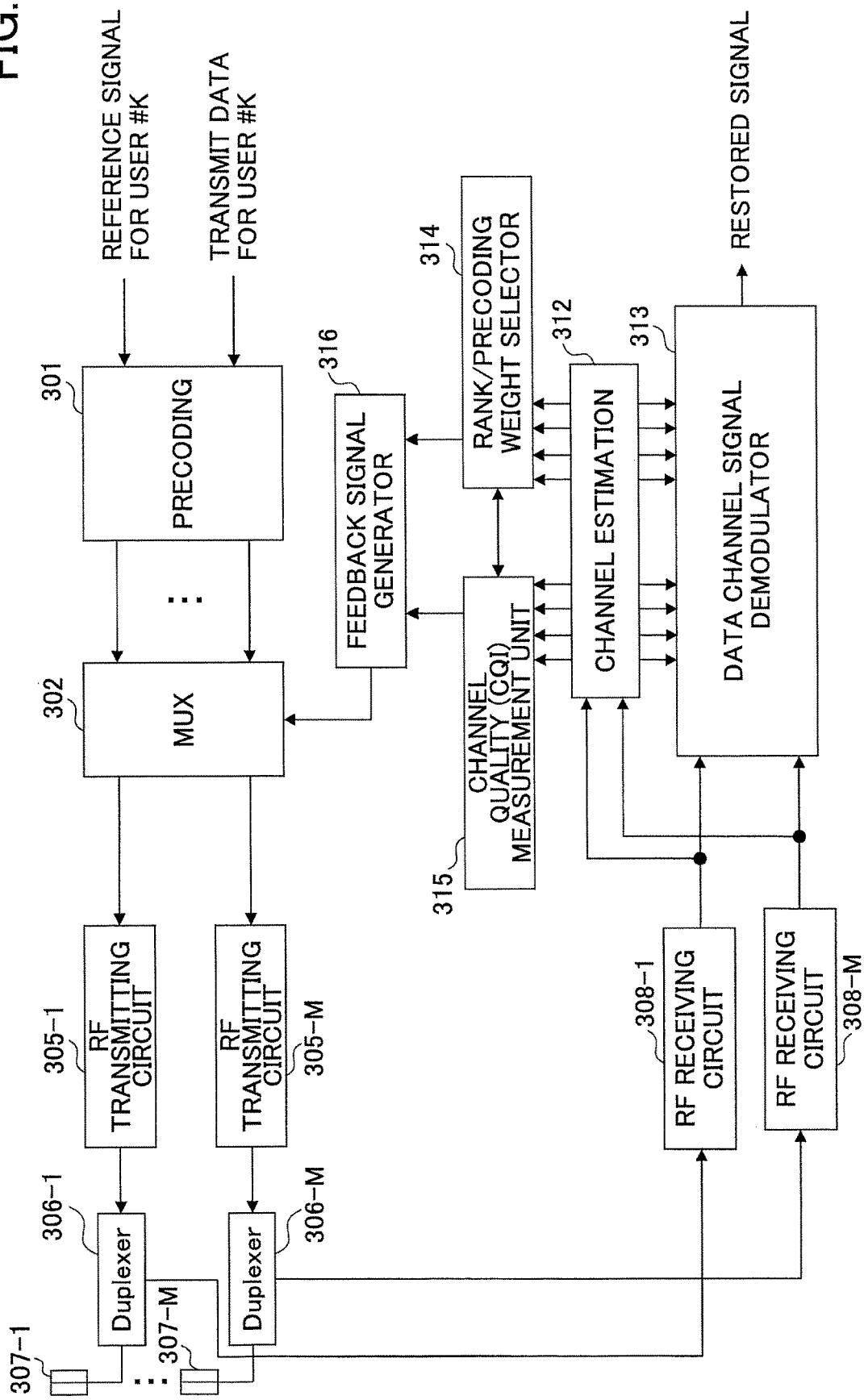

US 11,350,291 B2

BEAM TRACKING MOBILE COMMUNICATION SYSTEM, BASE STATION, AND USER EQUIPMENT

TECHNICAL FIELD

The present invention relates to a field of mobile communication technology, and especially relates to beam tracking technology in a 3D-MIMO (Three-Dimensional Multiple Input Multiple Output) based mobile communication system.

BACKGROUND ART

In Releases 8 to 11 of the technical specifications of the 3GPP (Third Generation Partnership Project), which is an international standardization organization, for a downlink of an LTE (Long Term Evolution) radio access scheme, technology has been adopted that is for a base station to execute beam forming in the horizontal direction by using a plurality of antenna ports (AP) arranged in a lateral direction. For Release 12, a three-dimensional MIMO (3D-MIMO) has been studied where, in addition to the horizontal direction, a beam is formed in the vertical direction by installing a plurality of antenna ports in the base station (cf. Non-Patent Documents 1 and 2, for example). By forming beams in the vertical direction (an elevation angle direction) and in the horizontal direction (an azimuth angle direction), it is expected that a system characteristic is enhanced.

For the purposes of the 3GPP standardization, the 3D-MIMO for a case where a number of transmit antenna ports is less than or equal to 8 is called the "vertical beam forming (Elevation Beamforming)," and for a case where the number of the transmit antenna ports is greater than 8 (e.g., 16, 32, or 64), it is called FD-MIMO (Full-dimensional MIMO). For the purposes other than the standardization, the FD-MIMO is also referred to as a large-scale (Massive) MIMO; and the antenna arrangement may not necessarily be the two-dimensional arrangement or the three-dimensional arrangement.

The FD-MIMO is technology for greatly enhancing the frequency utilization efficiency by forming a sharp beam (or a directivity) by using a very large number of base station antenna elements. Similar to the vertical beam forming, by using a plurality of antenna ports, a beam can be formed in the horizontal and vertical directions.

PRIOR ART DOCUMENT

Non-Patent Document

Non-Patent Document 1: 3GPP TSG RAN #58, RP-121994, "Study on Downlink Enhancement for Elevation Beamforming for LTE"
Non-Patent Document 2: 3GPP TSG RAN #58, RP-122015, "New SID Proposal: Study on Full Dimension for LTE"

SUMMARY OF INVENTION

Problem to be Solved by the Invention

For the FD-MIMO or the Massive MIMO, by applying precoding, beam gain can be increased; however, the beam width is narrowed. When the beam width is narrowed, an effect of a beam tracking error is increased, so that a hole tends to occur in the coverage. Considering the future mobile communication technology on and after the fifth generation (5G), it can be even assumed that the number of the antennas will be from several hundreds to several tens of thousands or more, so that an important problem is how to cause a beam to track a user.

Accordingly, an object is to provide beam tracking technology, with which effective beam tracking can be achieved.

Means for Solving the Problem

To achieve the above-described object, in a mobile communication system including a base station provided with a plurality of antenna ports, and user equipment that executes radio communication with the base station, the base station transmits a beam stream including a first beam for transmitting data to the user equipment, and one or more second beams for transmitting a precoded reference signal in a direction toward a vicinity of the first beam; and upon receiving the beam stream, the user equipment selects, from the first beam and the second beam, and transmits, to the base station, one or more suitable beam indexes.

Advantage of the Invention

For mobile communication based on the 3D-MIMO scheme, effective beam tracking can be achieved.

BRIEF DESCRIPTION OF DRAWINGS

FIG. 2C is a diagram illustrating another arrangement example of the plurality of antenna ports;
FIG. 3A is a diagram illustrating an example of a beam stream used for the beam tracking according to a first embodiment;
FIG. 3B is a diagram illustrating another example of the beam stream used for the beam tracking according to the first embodiment;
FIG. 4 is a diagram illustrating an example of multiplexing a reference signal for tracking into a PDSCH (Physical Downlink Shared Channel: a physical downlink shared channel);
FIG. 5 is a diagram illustrating a method of beam tracking according to a second embodiment;
FIG. 9 is a schematic configuration diagram of the user equipment to be used for the embodiment.

EMBODIMENTS OF THE INVENTION

In an embodiment, a base station transmits, to user equipment, one or a plurality of beam candidates, in addition to a currently formed beam (which is appropriately abbreviated as the "current beam"). The user equipment selects, from the current beam and the beam candidates, and feeds back, to the base station, one or more beam indexes. With this configuration, the base station can effectively cause a transmit beam to track the user equipment by using information on a current beam direction. For example, by limiting the beam candidates to a part in the vicinity of the current beam, the overheads of beam candidate transmission and feedback can be reduced.

Figure 1A:
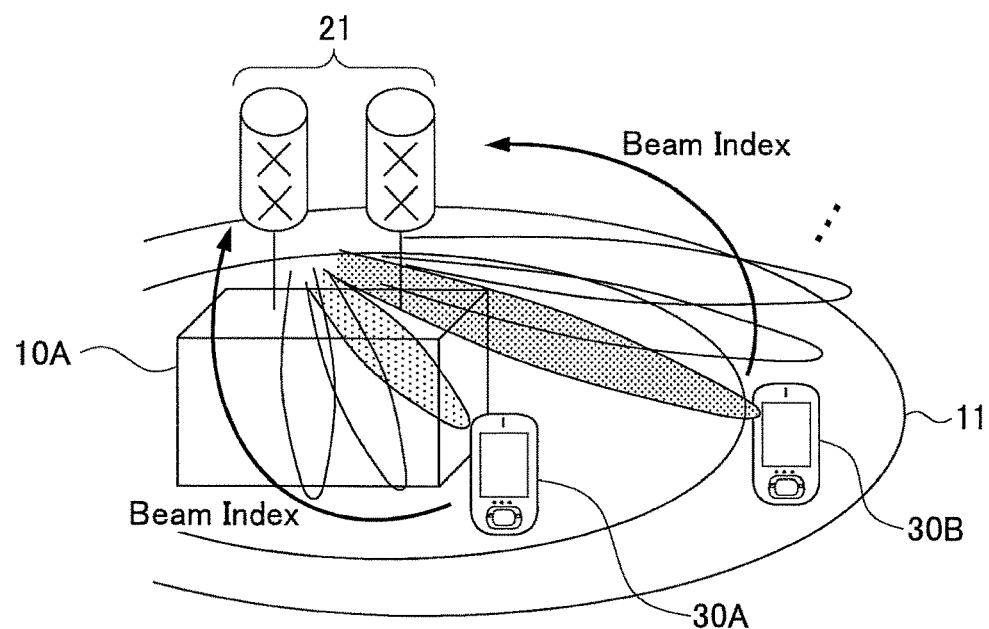
FIG. 1A is a schematic diagram of a mobile communication system to which beam tracking according to the embodiment is applied.
Figure 1B:
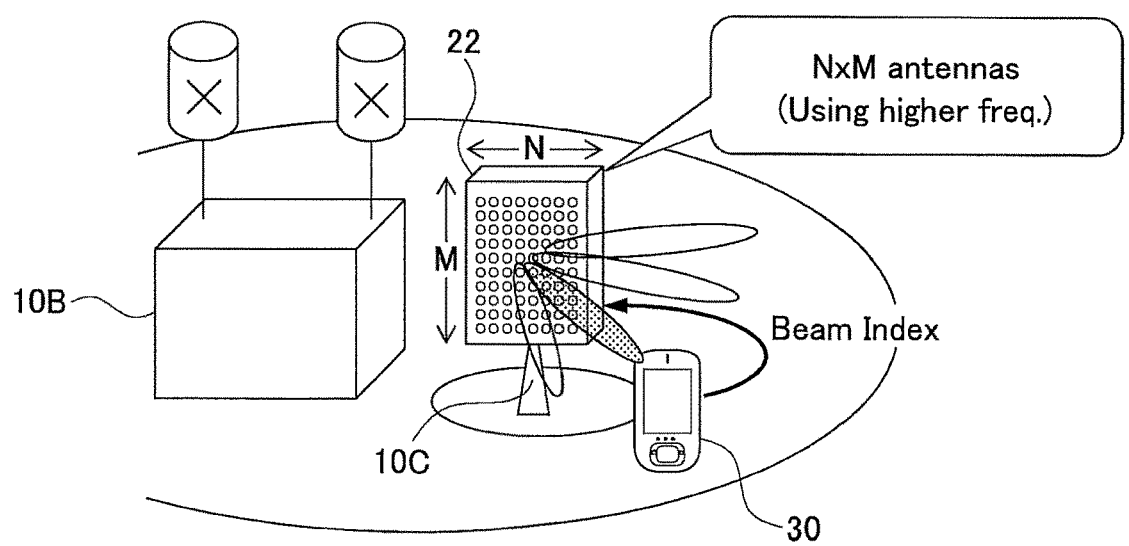
FIG. 1B is a schematic diagram of the mobile communication system to which the beam tracking according to the embodiment is applied.

FIG. 1A and FIG. 1B are schematic diagrams of a mobile communication system to which the beam tracking technology according to the embodiment is applied. FIG. 1A illustrates an example of elevation beamforming. A base station 10A is provided with an antenna 21 including a plurality of antenna ports; and the base station 10A transmits, to user equipment 30A and user equipment 308 that are served in a service area 11 of the own station, a data signal and a reference signal by a plurality of beams having directivity. The user equipment 30A and the user equipment 30B select and feed back, to the base station 10A, beam indexes (BI: Beam Index) that are favorable for own stations, respectively. By the elevation beamforming, tracking is facilitated for the movement in the vertical direction or in the radius direction of the cell (the near-far direction, when it is viewed from the base station 10A).

FIG. 1B illustrates an example of the massive MIMO. In the example of FIG. 1B, a remote base station 100 that is connected to the base station 108 is provided with an antenna apparatus 22 including two-dimensionally arrayed (N×M) antenna elements; and the remote base station 100 transmits a data signal and a reference signal by a plurality of beams having directivity. The user equipment 30 selects a favorable beam index; and the user equipment 30 feeds back the selected beam index to the base station 10B via the remote base station 100. The remote base station 100 executes RF (RF: Radio Frequency) transmission and reception with the user equipment 30, and RF front-end processing; and the base station 10B executes baseband processing. The combined base station 10B and the remote base station 100 may be regarded as the "base station 10."

Figure 2A:
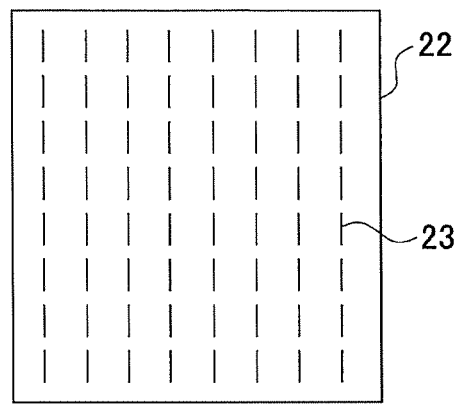
FIG. 2A is a diagram illustrating an arrangement example of a plurality of antenna ports.
Figure 2B:
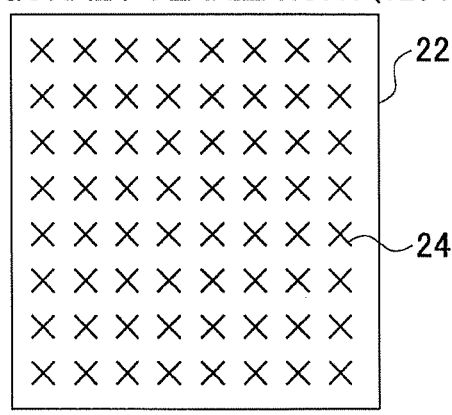
FIG. 2B is a diagram illustrating another arrangement example of the plurality of antenna ports.

FIG. 2A through FIG. 2C illustrate examples of the array of the antenna apparatus 22. In FIG. 2A, antenna elements 23 for a same polarization are two-dimensionally arrayed; and the elements form antenna ports, respectively, to provide 64 antenna ports.

In FIG. 2B, antenna elements 24 for an orthogonal polarization are two-dimensionally arrayed; and each of the antenna elements 24 corresponds to two orthogonal polarization directions to form two antenna ports. In this example, the number of the antenna ports is 128.

In FIG. 2C, a group of a plurality of elements forms one antenna port. In this example, similar to FIG. 2B, the antenna elements 24 for the orthogonal polarization are used, so that an element group 25 surrounded by a frame forms two antenna ports, which are an antenna port corresponding to a first polarization, and an antenna port corresponding to an orthogonal second polarization.

By adjusting, for each antenna port, an amount of phase rotation (and/or an amplitude) by multiplying data to be supplied to the antenna port by weighting of a precoding vector, a beam to be transmitted from a plurality of antenna ports can be caused to have a directivity. By increasing beam gain by precoding, a radio wave can be transmitted to far-away locations; however, a beam width is narrowed. Accordingly, the base station 10 executes beam tracking where a transmit beam is caused to track the user equipment 30, so that no hole is generated in the coverage, even if the beam width is narrowed.

FIG. 3A and FIG. 3B illustrate examples of a beam stream transmitted from the base station 10 during executing beam tracking. FIG. 3A and FIG. 3B illustrate the direction of the beams viewed from the antenna apparatus; the lateral direction of the paper surface is a horizontal direction or an azimuth angle direction, and the longitudinal direction is a vertical direction or an elevation/depression angle direction.

Referring to FIG. 3A, the base station 10 transmits, in addition to a beam #0 that is currently formed for data transmission to the user equipment 30, a tracking reference signal (TRS: Tracking Reference Signal) by beams #1 through #6. The beams #1 through #6 are beam candidates, which are used, upon detecting that the current beam #0 is not able to track the user equipment 30. By combining the beam #0 for data transmission and the beam candidates #1 through #6, a beam stream 51A is formed, which is for beam tracking. In FIG. 3A, a close-packed arrangement is used where adjacent beams are arranged in six directions from a specific beam; however, it can be a lattice-like arrangement, such as that of FIG. 3B.

Upon receiving the beam stream 51A, the user equipment 30 measures reception strength of each beam, and the user equipment 30 feeds back, to the base station 10, a beam index with a favorable reception state. The beam index to be fed back may be the optimum beam index, or beam indexes of top X beams. Alternatively, for all the beams #0 through #6, the measurement results may be fed back; or the measurement results may be fed back in a descending order of the reception quality or an ascending order of the measurement results.

As an example, a case is considered where the user equipment 30 moves toward the right direction, when the user equipment 30 is viewed from the antenna of the base station 10. The user equipment 30 is receiving downlink data through the current beam #0; however, the measured level of the beam #2 may become the largest, as the user equipment 30 moves. Upon receiving the feedback for the beam #2 from the user equipment 30, the base station 10 switches the current beam from the beam #0 to the beam #2, and the user equipment 30 arranges beam candidates in the vicinity of the beam #2 to transmit a tracking reference signal (TRS).

By transmitting the TRS by the beams #1 through #6, in addition to the current beam #0 that is for transmitting data, beam tracking using seven types of beams (three bits) can be achieved. Here, it may not always be required to define a new reference signal that is the TRS, and a precoded reference signal (i.e., which has directivity) for measuring a channel (CSI-RS: Channel State Information Reference Signal) may be used. Alternatively, the reference signal and the synchronization signal may be used that are defined or studied for the existing LTE system or the LTE-Advanced system, which is the evolution of the LTE. As examples of the existing or studied signals that can be used for beam tracking, there are synchronization signals, such as the PSS (Primary Synchronization Signal), the SSS (Secondary Synchronization Signal), and the Enhanced SS, the Discovery signal, and the Demodulation Reference signal (DM-RS: Demodulation Reference Signal); however, the signals are not limited to these.

For the current beam #0, the user equipment can measure the reception quality, for example, by the DM-RS, so that it is not always required to transmit separately a reference signal for beam tracking, such as the TRS.

According to this method, since a limited number of CSI-RSs (or TRSs) are transmitted in the vicinity of the currently formed beam #0, the overhead of the RS can be suppressed. The user equipment 30, on the other hand, selects a beam with favorable reception quality from the TRSs traveling with a plurality of directivities to feed back to the base station, so that downlink data can be received through a favorable beam that tracks the movement of the user equipment 30.

Measurement and selection of a signal by the user equipment 30 can be performed based on any parameter, such as a received power level, a SINR (Signal to Interference-plus-Noise Ratio), a RSRP (Reference Signal Received Power) measured through the TRS, or a RSRQ (Reference Signal Received Quality). In particular, by using the RSRP, the measurement and selection of the signal may be facilitated.

In FIG. 3B, the lattice-like arrangement is used where the adjacent beams are arranged in a grid. The beam stream 51B is transmitted where beam candidates #1 through #4 are arranged around the currently formed beam #0 in a cross-shape in the horizontal direction and the vertical. With this configuration, each beam can be identified by three bits, so that the overhead of the RS can be suppressed.

In FIG. 3A and FIG. 3B, the directivities of the beam candidates are formed, while being adjacent to the currently formed beam #0; however, the directions of the beam candidates may not be physically adjacent to the current beam #0. For example, for a case where the user equipment is moving with relatively high speed toward right when the user equipment is viewed from the antenna apparatus, the beam candidate #2 at the right side of the current beam #0 may be transmitted in a direction that is separated, to a certain extent, from the direction of the beam #0; or two or more beam candidates may be arranged at the right side of the current beam #0 with respective different azimuth angles.

Similarly, for a case where the user equipment is moving in a direction to approach the antenna apparatus (in the elevation angle direction) or in the downward direction, the beam #3 arranged below the current beam #0 may be transmitted in a direction that is separated, to a certain extent, downward from the direction of the beam #0; or two or more beam candidates may be arranged toward downward the current beam #0 with respective different elevation angles.

FIG. 4 illustrates an example of multiplexing the tracking reference signals (TRS). Since usual user equipment (legacy UE) cannot recognize the existence of the TRS, the performance of the legacy UE may be deteriorated when the TRS is multiplexed in the shared channel. Thus, it can be considered to be effective to multiplex the reference signal in a user specific (User-specific) region. Note that it is effective to multiplex a reference signal, not limited to the TRS, in the user specific region to suppress the deterioration of the performance of the usual user equipment.

Alternatively, it can be considered to multiplex it in the shared channel, while allowing the deterioration of the performance of the user equipment. In this case, by multiplexing the tracking reference signals (TRSs) #0 through #6 in the last symbol or in the symbols in the latter half of the subframe of the physical downlink shared channel (PDSCH: Physical Downlink Shared Channel), the timing difference between timing of measurement by the TRSs and timing of transmitting the data can be reduced, so that tracking precision can be enhanced.

In the example of FIG. 4, the TRSs #0 through #6 are transmitted in the third symbol from the last in the subframe of the scheduled PDSCH. It is not limited to this example, and it can be multiplexed in a suitable symbol position of the time slot in the latter half.

For a case where the TRS is multiplexed, in particular, in a user specific region, and density of frequency multiplexing is kept constant, if a transmission bandwidth of the PDSCH is narrow, a TRS resource number in the frequency direction is decreased, and the tracking precision is lowered. Conversely, if the transmission bandwidth of the PDSCH is broad, the tracking precision becomes high. Thus, the density of the TRS transmission is adjusted, so that the density of the TRS transmission becomes high for a case where the transmission bandwidth of the PDSCH is narrow, and that the density of the TRS transmission becomes low for a case where the transmission bandwidth of the PDSCH is broad. In this manner, reasonable estimation accuracy can be maintained, which does not depend on the frequency of the PDSCH allocation nor on the transmission bandwidth.

For the transmission of the TRS, a part of or all the information required for beam tracking, such as a transmission signal sequence, a time multiplexed position (frequency), a frequency multiplexed position (frequency), a code division multiplexing (CDM) sequence for code spreading, a number of TRSs to be transmitted, and a number of beam indexes (BI: Beam Index) to be fed back, may be configured at the base station 10.

By a configuration where the same transmission signal sequences are used for different TRSs, while only changing the time multiplexed position, the frequency multiplexed position, or the CDM sequence, a number of signaling bits may be reduced.

Additionally, for the purpose of tracking a plurality of beams, a plurality of the configuration information items may be used. In this case, the plurality of beams may be identified as the configuration numbers, or a configuration number to be fed back to a terminal may be dynamically specified, for example.

These configuration information items may be dynamically signaled by a physical downlink control channel (PDCCH: Physical Downlink Control Channel) or an ePDCCH (enhanced Physical Downlink Control Channel); may be semi-statically signaled by a higher layer; or may be signaled by a combination of a higher layer and a lower layer.

FIG. 5 illustrates an example where a plurality of beams 52 and 53 are configured. The base station 10 can configure a plurality of beam streams for beam tracking. The base station 10 may simultaneously execute beam tracking for the beam stream 52 and for the beam stream 53, respectively. The number of the beam streams for tracking may be in accordance with a transmission rank number.

For a case where there is sufficient beam tracking accuracy, the feedback information may be continued with the current beam index (BI). Thus, it can be arranged such that a number of feedback bits is reduced by transmitting a collective feedback report for the plurality of beam streams 52 and 53.

For example, a one-bit stream index may be multiplexed in the feedback information, and it can be arranged such that, when the value of the bit is "1," it indicates a request for changing the beam stream 53; and when the value of the bit is "0," it indicates a request for changing the beam stream 52. Further, for beam tracking using three bits, it can be arranged such that "000" indicates that it is not necessary to change all of the plurality of beams (TRSs).

Next, feeding back of the beam index (BI) by the user equipment 30 is described. The user equipment 30 measures the beam stream 51 including the current beam for transmitting the downlink data and beam candidates; and the user equipment 30 signals the selected beam index to the base station.

As in FIG. 4, especially, for a case where the tracking reference signals (TRSs) from the base station 10 are multiplexed in the PDSCH, it is efficient to multiplex the beam indexes in the ACK/NACK corresponding to the PDSCH. The feedback may be performed through the physical uplink control channel (PUCCH: Physical Uplink Control Channel), or through the physical uplink shared channel (PDSCH: Physical Uplink Shared Channel).

For a case where a plurality of beam streams 52 and 53 are received from the base station 10, feedback periods of the user equipment 30 may be arranged independently for the beam streams 52 and 53, respectively. For example, for a case where the beam stream 52 of FIG. 5 arrives at the user equipment as a direct wave from the base station, and the beam stream 53 arrives at the user equipment as a reflected wave, since the beam stream 52 arrives as a LOS (Line of Sight) wave, it can be considered that fluctuations are not so large. In this case, the overhead is reduced by arranging the feedback period for the beam stream 52 to be greater than the feedback period for the beam stream 53.

Additionally, it can be arranged such that a feedback trigger is transmitted to the user equipment 30 at the initiative of the base station 10. By following the feedback trigger by the base station 10, occasions of uplink transmission by the user equipment 30 are suppressed, so that the overhead of the feedback can be reduced.

When beam tracking is largely shifted, such as a case where the moving speed of the user equipment 30 is very high, the beam index to be fed back to the base station may not be selected due to severe deterioration of the reception quality. In this case, it can be set such that the user equipment 30 requests to reconfigure beam tracking by setting the thee-bit feedback information to be a specific value, such as "111."

Figure 6:
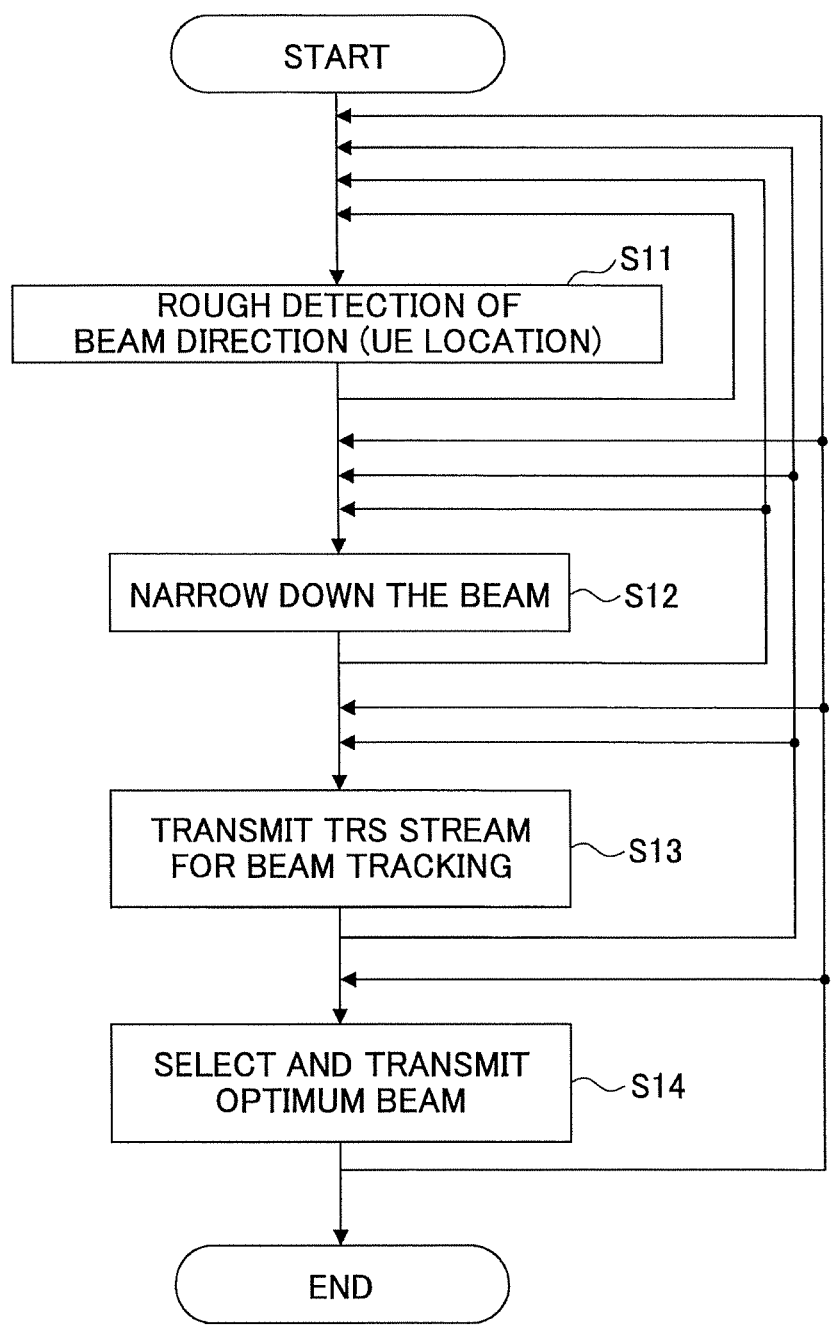
FIG. 6 is a flowchart of a beam tracking method to be executed by a base station.

FIG. 6 is a flowchart of beam tracking by the base station 10. Prior to initiation of beam tracking, the base station 10 may roughly detect the direction of the user equipment 30, namely, the direction in which a beam is to be formed (S11), and then the base station 10 may narrow down the direction of the beam (S12). The rough detection may be performed by using the PSS (Primary Synchronization Signal)/SSS (Secondary Synchronization Signal), the Discovery Signal, the positioning reference signal (PRS: Positioning Reference Signal), or the GPS (Global Positioning System). Though S11 and S12 are not essential to the present invention, by performing, to some extent, narrowing down the beam, the beam tracking can be smoothly performed. Though, in FIG. 6, data transmission is described only at a step subsequent to S13, data transmission may also be performed at a step subsequent to S11 or S12 based on a result of selecting a cell area/beam at S1 or S12. An approximate position of the user equipment 30 is repeatedly detected at every constant interval or based on information from the user equipment 30. Similarly, narrowing down of the beam is repeatedly performed at every constant interval or based on information from the user equipment 30. In response to a change in the position of the user, after narrowing down the beam, it can be repeated from positioning by returning to S11; or only S12 may be repeated.

The base station 10 transmits a beam stream for beam tracking (S13). At this time, as illustrated in FIG. 4 or FIG. 5, one or more beam streams may be transmitted. Each of the plurality of TRS signals forming the beam stream is precoded, so that a desired directivity is to be added. Based on the example of FIG. 4, a data signal to the user equipment 30 is transmitted by the beam #0, and at the same time, reference signals (e.g., the TRSs) for beam tracking are transmitted by the beams #1 through #6. The base station 10 obtains the result of receiving the beam stream from the user equipment 30, and the base station 10 selects an optimum beam (S14). The base station 10 can cause the transmit beam to track the user equipment by repeating transmission of the reference signals for beam tracking (S13) and selection of the optimum beam based on the information from the user equipment 30 (S14). After transmitting the reference signals (S13), or after selecting the optimum beam (S14), the process may be repeated by returning to S13, or the process may be restarted by returning to S11 or S12. For example, for a case where the transmit beam is not able to track the user equipment 30, the current direction of the user equipment 30 may be redetected by returning to S11 or S12.

Figure 7:
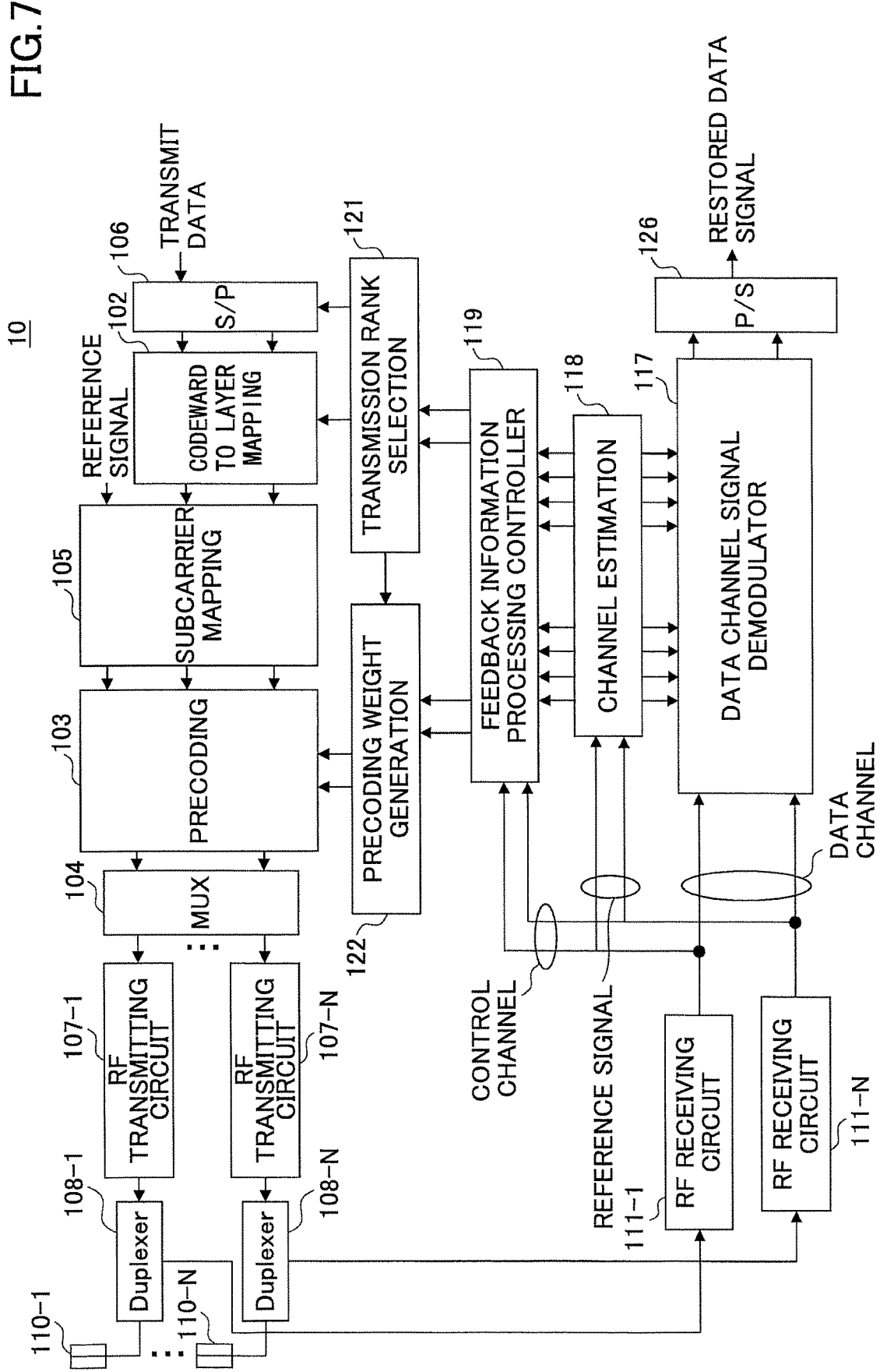
FIG. 7 is a schematic configuration diagram of a base station apparatus to be used for the embodiments.

FIG. 7 is a schematic configuration diagram of the base station 10. The base station 10 is provided with a plurality of antennas 110-1 through 110-N; and provided with RF transmitting circuits 107-1 through 107-N, and RF receiving circuits 111-1 through 111-N, which correspond to the number of the antennas.

The transmit data is converted, for example, for each codeword that is a unit of error correction coding and that is a unit of retransmission, into parallel data at a serial/parallel converter 106; and after receiving channel coding and modulation, the transmit data is mapped to a corresponding layer by a codeword to layer mapping unit 102. The layer-mapped transmit data is mapped, under the resource allocation control, to subcarriers by a subcarrier mapping unit 105. At this time, reference signals, such as the TRS and the CSI-RS, are mapped to the subcarriers. Here, the reference signals may have already been precoded. For a case where the reference signals for tracking are multiplexed in the shared channel, as in FIG. 4, it is desirable that the reference signals are mapped to a symbol position in the latter half part of the transmission frame.

The transmit data and the reference signals that are mapped to the subcarriers are input to a precoding unit 103. The precoding unit 103 multiplies the transmit data and the reference signals (including the TRSs for beam tracking), which are to be supplied to the antennas 110-1 to 110-N, by precoding vectors. Here, a part of the input signal may be precoded. For example, the reference signals may be precoded at a step prior to the subcarrier mapping.

The transmit signal that is weighted (a phase rotation amount and/or an amplitude variation amount are/is adjusted) by precoding is output from the multiplexer 104 as transmit signals for respective antennas 110. After receiving the discrete Fourier transform (DFT), the inverse Fourier transform (IFFT), and addition of the cyclic prefixes, which are not depicted, the transmit signals are converted into radio frequency signals by the RF transmitting circuits 107-1 through 107-N. The radio signals are transmitted from the antennas 111-1 through 111-N via the duplexers 108-1 through 108-N, respectively.

Feedback signals from the user equipment 30 are input, via the antennas 110-1 through 110-N and the duplexers 108-1 through 108-N, to the RF receiving circuits 111-1 through 111-N to be converted into baseband signals. Control signals and data channel signals are separated from the baseband signals; and feedback information is demodulated at a feedback information processing controller 119 based on estimated values at a channel estimation unit 118. The operation of the channel estimation unit 118 based on the reference signals for channel estimation, the demodulation (the operation of a data channel signal demodulator 117) and decoding of the data signals, and the operation of a parallel/serial converter 126 are not directly related to the invention, so that the description is omitted.

The feedback information processing controller 119 determines whether a beam index is included in the feedback information, or whether a beam tracking failure occurs. For a case where a beam index from the user equipment 30 is included in the feedback information, the beam index is reported to a precoding weight generator 122. For a case where a plurality of beam indexes are included in the feedback information, the optimum beam index and beam indexes for beam candidates are selected to be reported to the precoding weight generator 122. The precoding weight generator 122 generates a precoding vector corresponding to the beam index.

For a case where the feedback information indicates a beam tracking failure (e.g., a case where "111" is indicated), the beam may be narrowed down, and the precoding weight generator 122 may be instructed to reconfigure the precoding weight.

The demodulated feedback information is also supplied to a transmission rank selector 121. The precoding weight generator 122 may generate a precoding weight set, so that a number of beam streams corresponding to the number of the rank selected by the transmission rank selector 121 are formed.

Figure 8:
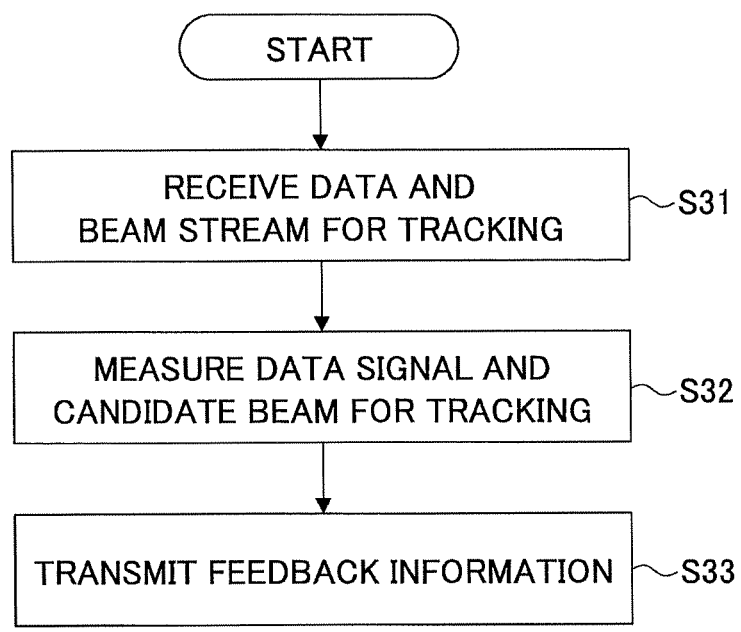
FIG. 8 is a flowchart of tracking signal processing to be executed by user equipment.

FIG. 8 is a processing flow to be executed by the user equipment 30. The user equipment 30 receives, together with downlink data addressed to the user equipment 30, beam streams for tracking, which include the beam candidates (S31). The received data signal and beam candidates for tracking are measured (S32); and a suitable beam index is included in the feedback information and transmitted to the base station (S33). Further, for a case where the received beam streams do not include a beam with reception quality that exceeds a threshold value, feedback information with a specific value (e.g., "111") may be returned. Furthermore, for a case where quality of the received beam stream is favorable, and it is not necessary to switch the beam, another specific value (e.g., "000") may be returned. For a case where a plurality of beam streams are received from the base station 10, a stream number for identifying a beam stream that needs to be changed may be included in the feedback information.

FIG. 9 is a schematic configuration diagram of the user equipment 30. The user equipment 30 receives, by antennas 307-1 through 307-M, the data signal and the reference signals for beam tracking (TRSs) transmitted from the base station 10; and inputs these, via duplexers 306-1 through 306-M, to the RF receiving circuits 308-1 through 308-M to receive baseband signals. The baseband signals are separated, via removal of the cyclic prefixes and the first Fourier transform, which are not depicted, into the data signal, the reference signals, and control signals.

The reference signals (including the CSI-RS and the TRS) that are demodulated based on the channel states estimated by a channel estimation unit 312 are input to a channel quality measurement unit 315, so that the channel quality is measured. A rank/precoding weight selector 314 selects a rank index and a precoding weight based on the measured channel quality.

A feedback signal generator 316 selects one or more favorable beam indexes from the received beam streams to generate a feedback signal. For a case where there is no favorable beam index, a feedback signal including, for example, a value of "111" is generated; and for a case where the beam is not to be switched, a feedback signal including, for example, a value of "000" is generated. For a case where a plurality of TRS beam streams are received, a bit for a stream index that collectively indicates selection information for the plurality of beam streams may be added to the feedback information.

The generated feedback information is combined with precoded uplink transmit data and reference signals at a multiplexer 302; and outputs as transmit data for each of the antennas 307. The transmit data including the feedback information are converted into radio frequency signals by the RF transmitting circuits 305-1 through 305-M. The radio signals are transmitted from the corresponding antennas 307-1 through 307-M via the duplexers 306-1 through 306-M.

By the above-described method and configuration, for a case where a beam with a strong directivity is formed by precoding, a transmit beam can be efficiently caused to track user equipment.

Note that the above-described technology can also be applied to the multi-user (MU) MIMO. In this case, a beam index that is desirable to be applied to simultaneously multiplexed user equipment, namely, a beam number with which the interference from another user is small may be fed back to the base station 10.

This patent application is based upon and claims the benefit of priority of Japanese Patent Application No. 2014-059180 filed on Mar. 20, 2014, and the entire contents of which are incorporated herein by reference.

The invention claimed is:

1. A mobile communication system comprising:
   a base station provided with a plurality of antenna ports; and
   a terminal that executes radio communication with the base station,
   wherein the base station transmits, to the terminal, a first beam for transmitting a data signal and a plurality of second beams for transmitting a plurality of synchronization signals,
   wherein the terminal measures a synchronization signal transmitted through the first beam and the plurality of synchronization signals transmitted through the plurality of second beams, and
   wherein the terminal selects one or more beams from the first beam and the plurality of second beams and transmits a result of the selection to the base station.

2. A terminal comprising:
   a receiver that receives a data signal from a base station through a first beam, and a plurality of synchronization signals through a plurality of second beams;
   a processor that measures a synchronization signal transmitted through the first beam and the plurality of synchronization signals transmitted through the plurality of second signals; and
   a transmitter that selects one or more beams from the first beam and the plurality of second beams and transmits a result of the selection to the base station.

3. A communication method executed by a terminal, the method comprising:
   receiving a data signal from a base station through a first beam, and receiving a plurality of synchronization signals through a plurality of second beams;
   measuring a synchronization signal transmitted through the first beam and the plurality of synchronization signals transmitted through the plurality of second signals; and selecting one or more beams from the first beam and the plurality of second beams and transmitting a result of the selection to the base station.

* * * * *